(12) United States Patent
Toyokawa et al.

(10) Patent No.: US 11,319,855 B2
(45) Date of Patent: May 3, 2022

(54) HEAT ACCUMULATION AND DISSIPATION DEVICE FOR INTERNAL COMBUSTION ENGINE

(71) Applicant: Honda Motor Co., Ltd., Tokyo (JP)

(72) Inventors: Masayuki Toyokawa, Saitama (JP); Hajime Uto, Saitama (JP); Masanobu Takazawa, Saitama (JP); Naoaki Takeda, Saitama (JP); Takahiro Okada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 16/739,122

(22) Filed: Jan. 10, 2020

(65) Prior Publication Data
US 2020/0224574 A1    Jul. 16, 2020

(30) Foreign Application Priority Data

Jan. 11, 2019    (JP) .............................. JP2019-003109

(51) Int. Cl.
*F01N 5/02* (2006.01)
*F02D 41/06* (2006.01)
(Continued)

(52) U.S. Cl.
CPC ................ *F01N 5/02* (2013.01); *F01P 11/16* (2013.01); *F02D 41/064* (2013.01);
(Continued)

(58) Field of Classification Search
CPC ....... F01N 5/02; F01P 11/16; F01P 2011/205; F01P 2025/30; F01P 2025/32;
(Continued)

(56) References Cited

U.S. PATENT DOCUMENTS

2017/0184008 A1*  6/2017  Nagai ...................... F01P 3/20
2018/0023453 A1*  1/2018  Okamura ................ F01P 7/165
                                                    123/142.5 E

FOREIGN PATENT DOCUMENTS

CN      102803695      11/2012
CN      104919146       9/2015
(Continued)

OTHER PUBLICATIONS

"Office Action of Japan Counterpart Application", dated Jan. 19, 2021, with English translation thereof, p. 1-p. 8.
(Continued)

*Primary Examiner* — Syed O Hasan
(74) *Attorney, Agent, or Firm* — JCIPRNET (57) ABSTRACT

A heat accumulation and dissipation device (1) for an internal combustion engine (2) includes, in a cooling circuit (3) for circulating cooling water used to cool the internal combustion engine (2), a heat accumulator (7) for accumulating the cooling water, and an exhaust heat recovery device (9) for recovering the heat of exhaust gas through the cooling water, wherein when the internal combustion engine (2) is started, heat is dissipated by sending the cooling water of the heat accumulator (7) to the internal combustion engine (2). The cooling circuit (3) includes a heat accumulation and dissipation circuit (8) configured to perform heat accumulation and dissipation while circulating the cooling water between the internal combustion engine (2) and the heat accumulator (7), and the heat accumulator (9) is arranged upstream of the heat accumulator (7) of the heat accumulation and dissipation circuit (8).

2 Claims, 4 Drawing Sheets

(51) Int. Cl.
*F01P 11/16* (2006.01)
*F01P 11/20* (2006.01)

(52) U.S. Cl.
CPC ...... *F02D 41/068* (2013.01); *F01P 2011/205* (2013.01); *F01P 2025/30* (2013.01); *F01P 2025/32* (2013.01); *F01P 2037/02* (2013.01)

(58) Field of Classification Search
CPC ....... F01P 2037/02; F01P 7/14; F02D 41/064; F02D 41/068
See application file for complete search history.

(56) References Cited

FOREIGN PATENT DOCUMENTS

| | | | |
|---|---|---|---|
| CN | 106536884 | | 3/2017 |
| EP | 3170998 | * | 5/2017 |
| JP | 2003035142 | | 2/2003 |
| JP | 2004143961 | | 5/2004 |
| JP | 2008038827 | | 2/2008 |
| JP | 2010169050 | | 8/2010 |
| JP | 2011231719 | | 11/2011 |
| WO | 2012127610 | | 9/2012 |

OTHER PUBLICATIONS

"Office Action of Japan Counterpart Application", dated Nov. 4, 2020, with English translation thereof, pp. 1-8.
Office Action of China Counterpart Application, with English translation thereof, dated Jun. 2, 2021, pp. 1-12.

* cited by examiner

HEAT ACCUMULATION AND DISSIPATION DEVICE FOR INTERNAL COMBUSTION ENGINE

CROSS-REFERENCE TO RELATED APPLICATION

This application claims the priority benefits of Japan Patent Application No. 2019-003109, filed on Jan. 11, 2019. The entirety of the above-mentioned patent application is hereby incorporated by reference herein and made a part of this specification.

BACKGROUND

Technical Field

The disclosure relates to a heat accumulation and dissipation device for internal combustion engine, the heat accumulation and dissipation device including, in a cooling circuit for cooling an internal combustion engine mounted on a vehicle, a heat accumulator for accumulating cooling water and storing the heat of the cooling water, and an exhaust heat recovery device for recovering the heat of exhaust gas discharged from the internal combustion engine through the cooling water, and heat is dissipated by sending the cooling water of the heat accumulator to the internal combustion engine when the internal combustion engine is started.

Related Art

Conventionally, for example, a device described in patent literature 1 (Japanese Laid-open No. 2008-38827) for warming up an engine at an early stage is known as the type of heat accumulation and dissipation device described above. In the cooling circuit of this device, a heat accumulator, an exhaust heat recovery device, a heater core, and a water pump are sequentially disposed downstream of the engine. In addition, a position immediately downstream of the heat accumulator and a position immediately upstream of the water pump are connected by a bypass pipe.

When the engine is started, high-temperature cooling water is released from the heat accumulator and then supplied to the engine via the bypass pipe. Accordingly, compared with a case in which the cooling water from the heat accumulator is not supplied to the engine, temperature rise of the engine can be speeded up. However, when the temperature of the engine is very low due to low atmospheric temperature, etc., the temperature of the engine may not be raised sufficiently even if all the high-temperature cooling water in the heat accumulator is supplied to the engine. Of course, if the capacity of the heat accumulator is increased, more high-temperature cooling water can be supplied to the engine. However, when the capacity of the heat accumulator is increased, the size of the heat accumulator also increases, and it becomes difficult to mount the heat accumulator on the vehicle.

In the cooling circuit of the above device, when the engine is started, the cooling water flowing out of the engine directly flows into the heat accumulator, and thus the temperature of the cooling water in the heat accumulator gradually decreases. When such low-temperature cooling water is supplied to the engine, the temperature rise of the engine at the time of start is suppressed. To avoid the above, in the above-mentioned device, when the temperature of the cooling water flowing out of the engine rises along with the start of the engine and becomes equal to or higher than a predetermined temperature, the flow path of the cooling water flowing through the bypass pipe is switched to allow the cooling water to pass through the exhaust heat recovery device, thereby raising the temperature of the cooling water. Specifically, the cooling water flowing out of the engine circulates in a manner of temporarily flowing into the heat accumulator and flowing out and then flowing into the engine through the exhaust heat recovery device and the heater core sequentially. In this way, by allowing the cooling water circulating in the cooling circuit to pass through the exhaust heat recovery device, the temperature of the cooling water is raised by the heat of the exhaust gas.

However, in the cooling circuit of the above device, in a case that even if all of the high-temperature cooling water in the heat accumulator is supplied to the engine, the temperature of the cooling water flowing out of the engine is lower than the above-mentioned predetermined temperature, that is, lower than the temperature of switching conditions to allow the cooling water to pass through the exhaust heat recovery device, and the engine is not warmed up sufficiently, the fuel consumption may be reduced or the exhaust characteristics may be deteriorated when the engine is operated in the above mentioned state. Additionally, the cooling water having a higher temperature may be accumulated in the heat accumulator to make the heat energy of the heat accumulator as large as possible. However, if the high-temperature cooling water is circulated in the cooling circuit for the purpose of accumulating higher-temperature cooling water in the heat accumulator, the temperature of the engine also increases and knocking is thereby prone to occur, which may cause the fuel consumption to increase.

SUMMARY

An embodiment of the disclosure provides a heat accumulation and dissipation device for internal combustion engine (a cooling device 1 of an embodiment (hereinafter the same applies in this technical solution)). The heat accumulation and dissipation device for internal combustion engine includes, in a cooling circuit 3 for circulating cooling water used to cool an internal combustion engine 2, a heat accumulator 7 for accumulating the cooling water and storing the heat of the cooling water, and an exhaust heat recovery device 9 for recovering heat of the exhaust gas discharged from the internal combustion engine through the cooling water. When the internal combustion engine is started, heat is dissipated by sending the cooling water of the heat accumulator to the internal combustion engine. The cooling circuit includes: a main circuit 4 through which the cooling water can be circulated at all times; and a heat accumulation and dissipation circuit 8 having the heat accumulator and configured to perform heat accumulation and dissipation while circulating the cooling water between the internal combustion engine and the heat accumulator. The exhaust heat recovery device is arranged upstream of the heat accumulator in the heat accumulation and dissipation circuit.

DESCRIPTION OF THE EMBODIMENTS

One or some exemplary embodiments of the disclosure provide a heat accumulation and dissipation device for internal combustion engine, which is capable of making the heat accumulator configured compactly and warming up an internal combustion engine at an early stage by continuously supplying high-temperature cooling water to the internal combustion engine at the time of starting the internal combustion engine, and which is also capable of accumulating the high-temperature cooling water in the heat accumulator while avoiding knocking of the internal combustion engine.

According to the configuration, the heat accumulation and dissipation device for internal combustion engine includes the main circuit and the heat accumulation and dissipation circuit in the cooling circuit, and in the heat accumulation and dissipation circuit, heat accumulation and dissipation are performed while the cooling water circulates between the internal combustion engine and the heat accumulator. For example, when high-temperature cooling water is accumulated in the heat accumulator, the high-temperature cooling water is sent to the internal combustion engine (heat dissipation) from the heat accumulator when the internal combustion engine is started, and the temperature of the internal combustion engine is thereby increased. In this case, although the cooling water that flows out of the internal combustion engine and has a lower temperature than the cooling water of the heat accumulator flows to the heat accumulator side, the cooling water heated by the exhaust heat recovery device flows into the heat accumulator because the exhaust heat recovery device is disposed upstream of the heat accumulator in the heat accumulation and dissipation circuit. As a result, even when the capacity of the heat accumulator that accumulates the cooling water is small, high-temperature cooling water can still be continuously supplied from the heat accumulator to the internal combustion engine when heat is dissipated by the heat accumulator, and thus the heat accumulator can be configured compactly and the internal combustion engine at the time of start can be warmed up at an early stage.

On the other hand, during operation of the internal combustion engine, the cooling water flowing out of the internal combustion engine is heated by the exhaust heat recovery device and then flows into the heat accumulator. As a result, when heat is stored by the heat accumulator, the high-temperature cooling water can be accumulated in the heat accumulator.

An embodiment of the disclosure is the heat accumulation and dissipation device for internal combustion engine according to technical solution 1, wherein the main circuit has a common flow path (a first flow path 4a and a second flow path 4b of the main circuit 4) that partially shares the flow path of the cooling water with the heat accumulation and dissipation circuit, and the exhaust heat recovery device is disposed in the common flow path.

According to this configuration, in the cooling circuit, the main circuit and the heat accumulation and dissipation circuit have a common flow path, and the exhaust heat recovery device is disposed in the common flow path. Accordingly, the heat accumulation and dissipation in the heat accumulation and dissipation circuit can be ensured, the flow path of the entire cooling circuit can be shortened and circulation efficiency of the cooling water can be improved compared with a case in which the heat accumulation and dissipation circuit is configured with a circulation flow path independent of the main circuit.

An embodiment of the disclosure is the heat accumulation and dissipation device for internal combustion engine according to technical solution 1 or 2, wherein the heat accumulation and dissipation circuit further includes a pump (a heat accumulator pump 16) for sending the cooling water to the heat accumulator, and a flow rate regulation valve 15 for regulating the flow rate of the cooling water supplied to the heat accumulator, and a control part (ECU 20a) for controlling the pump and the flow rate regulation valve is further included.

According to this configuration, by performing control to drive the pump and open the flow rate regulation valve, the cooling water can be smoothly circulated between the internal combustion engine and the heat accumulator in the heat accumulation and dissipation circuit. In addition, by controlling the pump and the flow rate regulation valve with the control part, the flow speed or flow rate of the cooling water circulating in the heat accumulation and dissipation circuit can be regulated. As a result, heat accumulation and dissipation by the heat accumulator can be appropriately regulated according to the operation state of the internal combustion engine.

An embodiment of the disclosure is the heat accumulation and dissipation device for internal combustion engine according to technical solution 3, further including a cooling water temperature detection part (an inlet water temperature sensor 18) for detecting the temperature of the cooling water flowing into the internal combustion engine, wherein the control part controls at least one of the pump and the flow rate regulation valve so as to reduce the flow rate of the cooling water flowing out of the heat accumulator when the detected temperature (an inlet water temperature TWI) of the cooling water is equal to or higher than a predetermined temperature.

According to this configuration, when the temperature of the cooling water flowing into the internal combustion engine is equal to or higher than a predetermined temperature, at least one of the pump and the flow rate regulation valve is controlled to reduce the flow rate of the cooling water flowing out of the heat accumulator. As described above, when the temperature of the internal combustion engine increases, knocking is prone to occur. Therefore, to avoid the knocking, when the temperature of the cooling water flowing into the internal combustion engine is equal to or higher than a predetermined temperature, the flow rate of the high-temperature cooling water sending from the heat accumulator to the internal combustion engine is reduced. Accordingly, the temperature rise of the internal combustion engine can be suppressed, and thereby occurrence of knocking can be avoided and deterioration of fuel consumption can be prevented.

Figure 1:
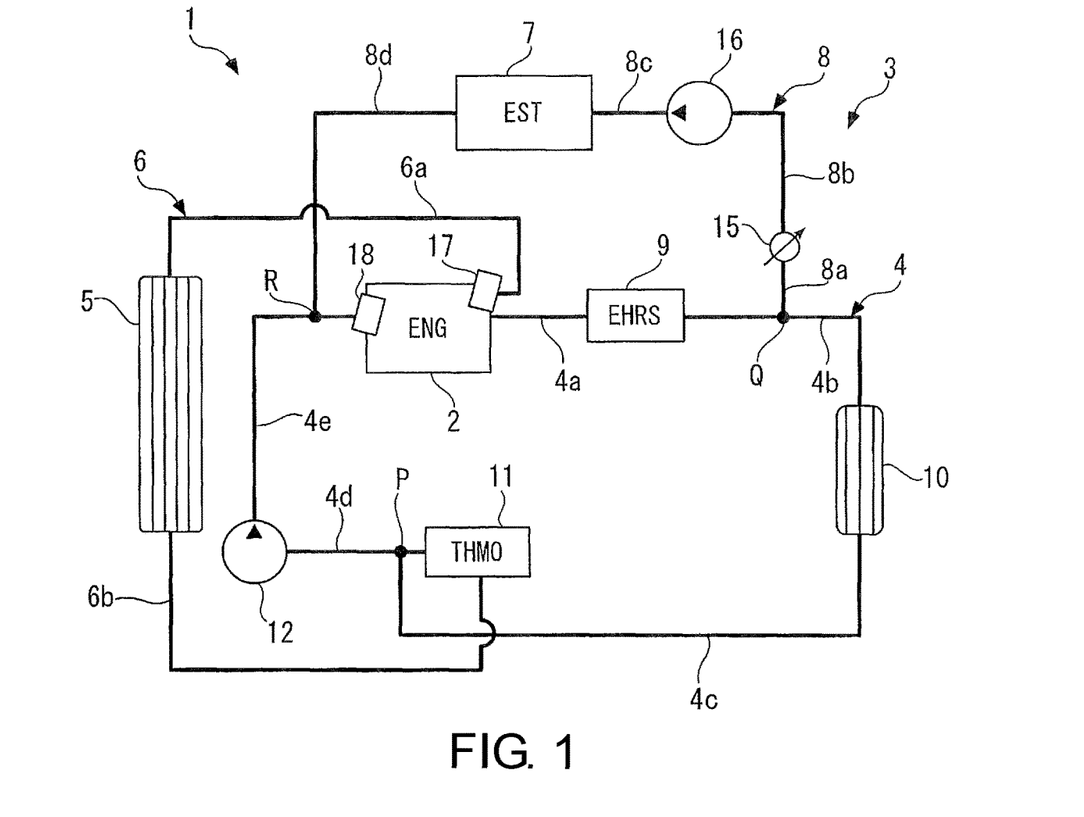
FIG. 1 is a diagram schematically showing a cooling device for internal combustion engine in which a heat accumulation and dissipation device according to one embodiment of the disclosure is applied.

Hereinafter, exemplary embodiments of the disclosure are described in detail with reference to the drawings. FIG. 1 schematically shows a cooling device for internal combustion engine in which a heat accumulation and dissipation device according to one embodiment of the disclosure is applied. The cooling device 1 is applied in a vehicle equipped with an internal combustion engine 2 as a drive source, and is capable of accumulating and dissipating heat through cooling water, in addition to cooling the internal combustion engine 2.

As shown in FIG. 1, the cooling device 1 includes a cooling circuit 3 for circulating cooling water (for example, LLC (Long Life Coolant)) used to cool the internal combustion engine 2 (hereinafter, referred to as "engine"). The cooling circuit 3 includes: a main circuit 4 in which the cooling water can be circulated at all times; a radiator 5 for cooling the cooling water by heat dissipation to the outside; a radiator circuit 6 for circulating the cooling water between the engine 2 and the radiator 5; a heat accumulator 7 for accumulating the cooling water and storing the heat of the cooling water; a heat accumulation and dissipation circuit 8 for circulating the cooling water between the engine 2 and the heat accumulator 7; an exhaust heat recovery device 9 disposed in a common flow path described later of the main circuit 4 and the heat accumulation and dissipation circuit 8; a heater core 10 disposed in the main circuit 4; and so on.

The main circuit 4 includes a first flow path 4a, a second flow path 4b, a third flow path 4c, a fourth flow path 4d, and a fifth flow path 4e as flow paths through which the cooling water flows. Specifically, the first flow path 4a is arranged to connect the engine 2 and the exhaust heat recovery device 9; the second flow path 4b is arranged to connect the exhaust heat recovery device 9 and the heater core 10; the third flow path 4c is arranged to connect the heater core 10 and a predetermined position of the fourth flow path 4d; the fourth flow path 4d is arranged to connect the thermostat 11 and the water pump 12; and the fifth flow path 4e is arranged to connect the water pump 12 and the engine 2.

The first flow path 4a is connected to a cooling water outlet of a water jacket (not shown) of the engine 2 and is also connected to a cooling water inlet of the exhaust heat recovery device 9. The exhaust heat recovery device 9 is disposed in an exhaust pipe (not shown) of the engine 2, includes an exhaust gas flow path through which exhaust gas discharged from the engine 2 in operation flows and a cooling water flow path through which the cooling water flows (neither of the flow paths is illustrated), and recovers the heat of the exhaust gas through the cooling water. That is, when high-temperature exhaust gas flows through the exhaust gas flow path, the heat of the exhaust gas moves to the cooling water flowing through the cooling water flow path (heating), and the temperature of the cooling water is raised.

In addition, the second flow path 4b is connected to a cooling water outlet of the exhaust heat recovery device 9, and is also connected to a cooling water inlet of the heater core 10. The heater core 10 has a plurality of fins, and the warm air generated by the cooling water flowing through inside the heater core 10 is used for warming up the interior of the vehicle. Besides, the third flow path 4c is connected to a cooling water outlet of the heater core 10 and is also connected to a predetermined position (hereinafter, referred to as "connection position P") in the middle of the fourth flow path 4d.

The fourth flow path 4d is connected to the thermostat 11 and is also connected to a cooling water suction port of the water pump 12. The water pump 12 is configured of an electric pump. Additionally, the fifth flow path 4e is connected to a cooling water discharge port of the water pump 12, and is also connected to a cooling water inlet of the water jacket of the engine 2.

Figure 3:
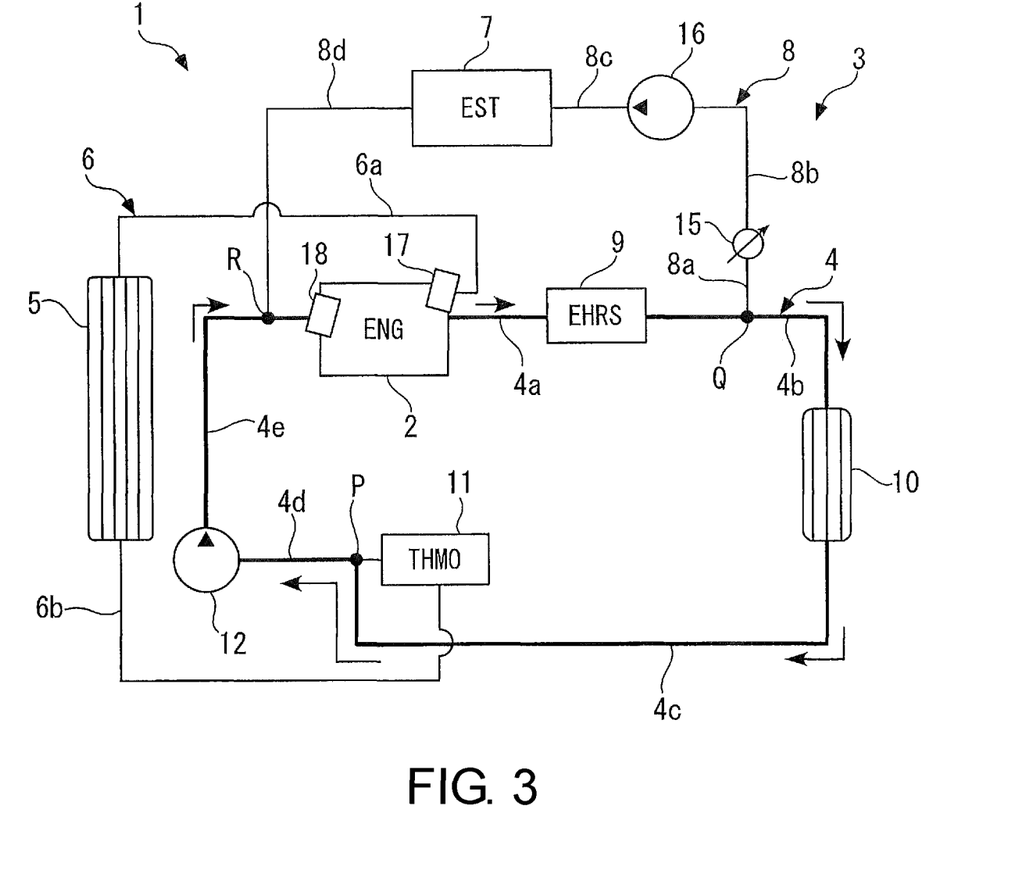
FIG. 3 is an explanatory diagram demonstrating a flow of cooling water in a cooling circuit of the cooling device, and shows a state in which the cooling water is flowing only in a main circuit of the cooling circuit.

In the main circuit 4 configured as described above, when the water pump 12 is driven, the cooling water flowing out of the engine 2 circulates so as to flow sequentially through the first flow path 4a, the exhaust heat recovery device 9, the second flow path 4b, the heater core 10, the third flow path 4c, the fourth flow path 4d, and the fifth flow path 4e and flow into the engine 2 (see FIG. 3).

In addition, as shown in FIG. 1, the radiator circuit 6 includes a first flow path 6a and a second flow path 6b as flow paths through which the cooling water flows, and shares the fourth flow path 4d and the fifth flow path 4e of the main circuit 4. Specifically, the first flow path 6a is arranged to connect the engine 2 and the radiator 5, and the second flow path 6b is arranged to connect the radiator 5 and the thermostat 11.

The first flow path 6a is connected to a cooling water outlet of the water jacket of the engine 2 and is also connected to a cooling water inlet of the radiator 5. The radiator 5 has a plurality of fins and cools the cooling water by means of heat dissipation to the outside by the cooling water flowing through inside the radiator 5. In addition, the second flow path 6b is connected to a cooling water outlet of the radiator 5, and is also connected to the thermostat 11. When the temperature of the cooling water is equal to or higher than a predetermined temperature (for example, 90° C.), the thermostat 11 opens, and the second flow path 6b and the fourth flow path 4d of the main circuit 4 are communicated with each other.

Figure 5:
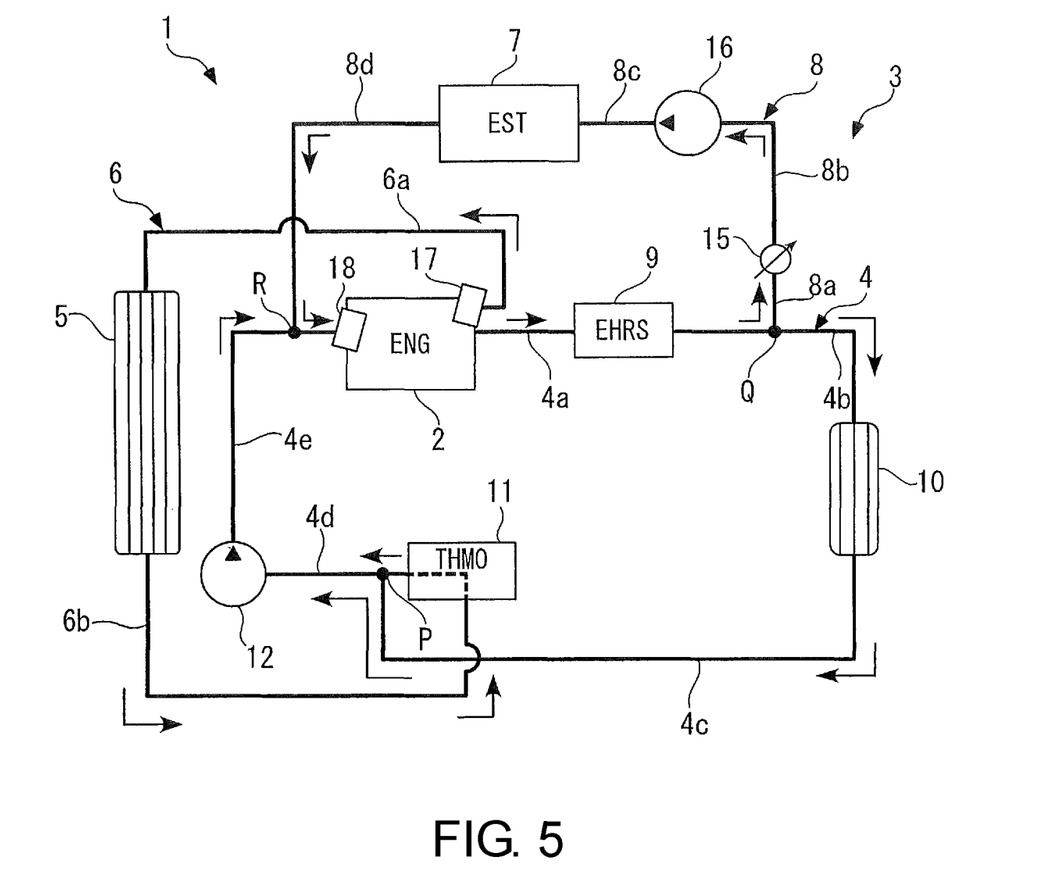
FIG. 5 is an explanatory diagram similar to FIG. 3 and shows a state in which a thermostat is opened and the cooling water is also flowing in a radiator circuit in addition to the main circuit and the heat accumulation and dissipation circuit.

In the radiator circuit 6 configured as described above, when the water pump 12 is driven and the thermostat 11 is opened, the cooling water flowing out of the engine 2 circulates so as to flow sequentially through the first flow path 6a, the radiator 5, the second flow path 6b, the thermostat 11, and the fourth flow path 4d and the fifth flow path 4e of the main circuit 4 and flow into the engine 2 (see FIG. 5). Moreover, when the thermostat 11 is closed since the temperature of the cooling water is lower than the predetermined temperature, the cooling water does not circulate in the above-described path.

In addition, as shown in FIG. 1, the heat accumulation and dissipation circuit 8 includes a first flow path 8a, a second flow path 8b, a third flow path 8c, and a fourth flow path 8d as flow paths through which the cooling water flows, and shares the first flow path 4a, the second flow path 4b, and the fifth flow path 4e of the main circuit 4. Specifically, the first flow path 8a is arranged to connect a predetermined position of the second flow path 4b of the main circuit 4 and the flow rate regulation valve 15; the second flow path 8b is arranged to connect the flow regulation valve 15 and the accumulator pump 16; the third flow path 8c is arranged to connect the heat accumulator pump 16 and the heat accumulator 7; and the fourth flow path 8d is arranged to connect the heat accumulator 7 and a predetermined position of the fifth flow path 4e of the main circuit 4.

The first flow path 8a is connected to a predetermined position (hereinafter, referred to as "connection position Q") in the middle of the second flow path 4b of the main circuit 4, and is also connected to the flow rate regulation valve 15. The flow rate regulation valve 15 is configured in a manner that the opening degree is variable between a fully closed state and a fully opened state, and the flow rate of the cooling water flowing to the heat accumulator 7 side is regulated by changing the opening degree.

The second flow path 8b is connected to the flow rate regulation valve 15, and is also connected to a cooling water suction portion of the heat accumulator pump 16. Similar to the water pump 12, the heat accumulator pump 16 is configured of an electric pump.

The third flow path 8c is connected to a cooling water discharge port of the heat accumulator pump 16, and is also connected to a cooling water inlet of the heat accumulator 7. The heat accumulator 7 is formed in a tank shape having a relatively small predetermined capacity and has a vacuum layer between an inner layer and an outer layer. The heat accumulator 7 configured as described above is excellent in heat retaining property and can retain the heat of the accumulated cooling water for a long time.

The fourth flow path 8d is connected to a cooling water outlet of the heat accumulator 7, and is also connected to a predetermined position (hereinafter, referred to as "connection position R") in the middle of the fifth flow path 4e of the main circuit 4.

Figure 4:
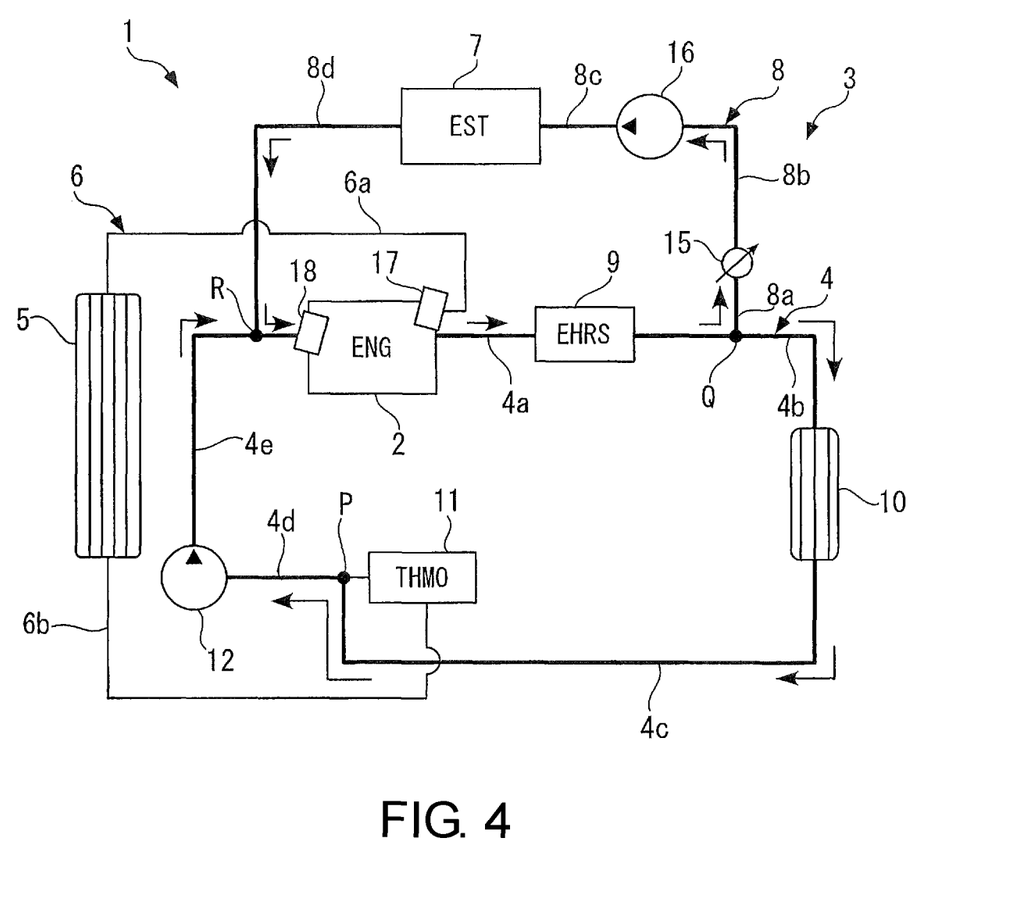
FIG. 4 is an explanatory diagram similar to FIG. 3 and shows a state in which the cooling water is also flowing in the heat accumulation and dissipation circuit in addition to the main circuit.

In the heat accumulation and dissipation circuit 8 configured as described above, when the heat accumulator pump 16 is driven and the flow rate regulation valve 15 is opened, the cooling water flowing out of the engine 2 circulates so as to flow sequentially through the first flow path 4a of the main circuit 4, the exhaust heat recovery device 9, the second flow path 4b of the main circuit 4, the first flow paths 8a, the second flow path 8b and the third flow path 8c of the heat accumulation and dissipation circuit 8, the heat accumulator 7, the fourth flow path 8d of the heat accumulation and dissipation circuit 8, and the fifth flow path 4e of the main circuit 4 and flow into the engine 2 (see FIG. 4).

In addition, the engine 2 includes an outflow water temperature sensor 17 for detecting the temperature of the cooling water flowing out of the water jacket of the engine 2 (hereinafter, referred to as "outflow water temperature TWO"), and an inflow water temperature sensor 18 (a cooling water temperature detection part) for detecting the temperature of the cooling water flowing into the water jacket (hereinafter, referred to as "inflow water temperature TWI").

Figure 2:
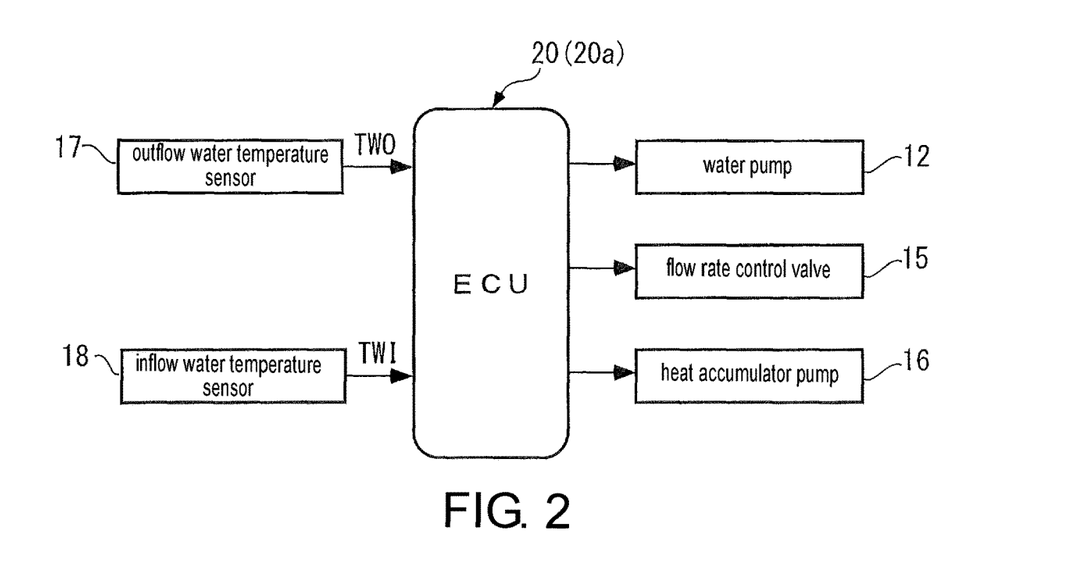
FIG. 2 is a block diagram showing a control part in the cooling device of FIG. 1.

FIG. 2 shows a control part 20 in the cooling device 1. The control part 20 includes an ECU 20a, and the ECU 20a is composed of a microcomputer including a CPU, a RAM, a ROM, an I/O interface (none of the parts are illustrated), and the like. The outflow water temperature TWO and the inflow water temperature TWI respectively detected by the outflow water temperature sensor 17 and the inflow water temperature sensor 18 described above are output to the ECU 20a. The ECU 20a then controls the water pump 12, the flow rate regulation valve 15, the heat accumulator pump 16 and the like according to the detection signals and so on.

Next, the flow of the cooling water in the cooling circuit 3 of the cooling device 1 and heat accumulation and dissipation by the heat accumulator 7 are described below with reference to FIGS. 3 to 5. Moreover, in the cooling circuit diagrams of FIGS. 3 to 5 described below, the directions in which the cooling water flows are indicated by arrows, the flow paths through which the cooling water flows are indicated by thick lines, and the flow paths through which the cooling water does not flow are indicated by thin lines.

FIG. 3 shows a state in which the cooling water flows only in the main circuit 4. As described above, by driving the water pump 12 of the main circuit 4, the cooling water flowing out of the engine 2 circulates in a clockwise manner as shown in FIG. 4 so as to flow sequentially through the first flow path 4a, the exhaust heat recovery device 9, the second flow paths 4b, the heater core 10, the third flow path 4c, the fourth flow path 4d, and the fifth flow path 4e and flow into the engine 2.

FIG. 4 shows a state in which the cooling water also flows in the heat accumulation and dissipation circuit 8 in addition to the main circuit 4 in FIG. 3 at the start of the engine 2. Moreover, in this case, the high-temperature cooling water is accumulated in the heat accumulator 7 of the heat accumulation and dissipation circuit 8 before the engine 2 is started.

When the engine 2 is started, if the heat accumulator pump 16 is driven and the flow rate regulation valve 15 is opened, the cooling water flows in the heat accumulation and dissipation circuit 8 in a counter-clockwise direction as shown in FIG. 4. In this case, the high-temperature cooling water in the heat accumulator 7 is sent and supplied to the engine 2 via the fourth flow path 8d of the heat accumulation and dissipation circuit 8 and the fifth flow path 4e of the main circuit 4. That is, the heat stored in the heat accumulator 7 is dissipated to the engine 2, and thereby raising the temperature of the engine 2.

In this case, the cooling water flowing out of the engine 2 and having a temperature lower than that of the cooling water in the heat accumulator 7 is sent to the exhaust heat recovery device 9 via the first flow path 4a of the main circuit 4 and then flows through the cooling water flow path inside the exhaust heat recovery device 9 to thereby be heated by the heat of the exhaust gas flowing through the exhaust gas flow path. Then, the cooling water flowing out of the exhaust heat recovery device 9 branches at the connection position Q of the second flow path 4b of the main circuit 4, and flows into the heat accumulator 7 via the first flow path 8a, the second flow path 8b and the third flow path 8c of the heat accumulation and dissipation circuit 8. In this way, since the high-temperature cooling water heated in the exhaust heat recovery device 9 flows into the heat accumulator 7, a temperature drop of the cooling water in the heat accumulator 7 is prevented. Therefore, during the heat dissipation by the heat accumulator 7, high-temperature cooling water can be continuously supplied from the heat accumulator 7 to the engine 2, and thereby the engine 2 can be warmed up at an early stage.

FIG. 5 shows an operation state of the engine 2 after the warm-up, in which the thermostat 11 opens since the temperature of the cooling water rises and the cooling water also flows in the radiator circuit 6 in addition to the main circuit 4 and the heat accumulation and dissipation circuit 8 shown in FIG. 4.

As described above, when the thermostat 11 is opened with the water pump 12 being driven, the cooling water flowing out of the engine 2 circulates so as to flow sequentially through the first flow path 6a, the radiator 5, and the second flow path 6b of the radiator circuit 6, the thermostat 11, as well as the fourth flow path 4d and the fifth flow path 4e of the main circuit 4 and flow into the engine 2. In this case, the cooling water passing through the thermostat 11 joins the cooling water flowing through the third flow path 4c at the connection position P of the main circuit 4. In addition, the cooling water discharged from the water pump 12 joins the high-temperature cooling water flowing out of the heat accumulator 7 at the connection position R of the main circuit 4 and then flows into the engine 2.

Besides, by the cooling water circulating in the heat accumulation and dissipation circuit 8 as described above, the cooling water heated by the exhaust heat recovery device 9 is sent to the engine 2 while being accumulated in the heat accumulator 7. Accordingly, the high-temperature cooling water is accumulated in the heat accumulator 7 and the heat thereof is stored.

In addition, in the cooling device 1, the flow rate regulation valve 15 and the heat accumulator pump 16 of the heat accumulation and dissipation circuit 8 are controlled as follows according to the inflow water temperature TWI detected by the inflow water temperature sensor 18. For example, when the inflow water temperature TWI is equal to or higher than a predetermined temperature, at least one of the flow rate regulation valve 15 and the heat accumulator pump 16 is controlled so as to reduce the flow rate of the cooling water flowing out of the heat accumulator 7. Specifically, the flow rate regulation valve 15 is controlled to reduce the opening degree of the flow rate regulation valve 15, and the heat accumulator pump 16 is controlled to reduce the rotation speed of the heat accumulator pump 16. By controlling the flow rate regulation valve 15 and the heat accumulator pump 16 as described above, temperature rise of the cooling water flowing into the engine 2 can be suppressed, and occurrence of knocking due to an increase in the temperature of the engine 2 can be avoided.

As described above in detail, according to the present embodiment, in the heat accumulation and dissipation circuit 8 for accumulating and dissipating heat while circulating the cooling water between the engine 2 and the heat accumulator 7, the exhaust heat recovery device 9 is arranged upstream of the heat accumulator 7, and thus even if the capacity of the heat accumulator 7 for accumulating cooling water is small, high-temperature cooling water can still be continuously supplied from the heat accumulator 7 to the engine 2 during the heat dissipation by the heat accumulator 7. Thus, the heat accumulator 7 can be configured compactly and the engine 2 being started can be warmed up at an early stage. On the other hand, during operation of the engine 2, the cooling water that flows out of the engine 2 is constantly heated by the exhaust heat recovery device 9 and then flows into the heat accumulator 7, and thus high-temperature cooling water can be accumulated in the heat accumulator 7 during the heat accumulation by the heat accumulator 7.

In addition, since the exhaust heat recovery device 9 is disposed in the common flow paths (the first flow path 4a and the second flow path 4b of the main circuit 4) of the main circuit 4 and the heat accumulation and dissipation circuit 8, the flow path of the entire cooling circuit can be shortened and the cooling water can be circulated efficiently compared with a case in which the heat accumulation and dissipation circuit 8 is configured with a circulation flow path independent of the main circuit 4.

Furthermore, by controlling the heat accumulator pump 16 and the flow rate regulation valve 15 of the heat accumulation and dissipation circuit 8, the flow speed or the flow rate of the cooling water circulating through the heat accumulation and dissipation circuit 8 can be regulated. As a result, the heat accumulation and dissipation by the heat accumulator 7 can be appropriately regulated according to the operation state of the engine 2. In particular, when the inflow water temperature TWI is equal to or higher than a predetermined temperature, the temperature rise of the engine 2 can be suppressed by decreasing the flow rate of the high-temperature cooling water flowing out of the heat accumulator 7 and supplied to the engine 2, and thereby the occurrence of knocking can be avoided and the deterioration of fuel consumption can be prevented.

Moreover, the disclosure is not limited to the above-mentioned embodiment and can be implemented in various aspects. For example, in the embodiment, the case is described in which the heat accumulation and dissipation device of the disclosure is applied to the cooling device 1 of a vehicle equipped with the engine 2 as a drive source. Of course, the heat accumulation and dissipation device of the disclosure may also be applied to a cooling device of a hybrid vehicle equipped with, in addition to the engine 2, a motor as a drive source. Further, the detailed configuration of the main circuit 4, the radiator circuit 6 and the heat accumulation and dissipation circuit 8 of the cooling circuit 3, as well as the heat accumulator 7 and the exhaust heat recovery device 9 shown in the embodiment are for purposes of illustration only, and changes may be appropriately made without departing from the spirit of the disclosure.

What is claimed is:

1. A heat accumulation and dissipation device for internal combustion engine, comprising, in a cooling circuit for circulating cooling water used to cool an internal combustion engine, a heat accumulator for accumulating cooling water and storing the heat of the cooling water, and an exhaust heat recovery device for recovering the heat of exhaust gas discharged from the internal combustion engine through the cooling water, wherein when the internal combustion engine is started, heat is dissipated by sending the cooling water of the heat accumulator to the internal combustion engine;

the cooling circuit comprises:
a main circuit through which the cooling water is circulated at all times; and
a heat accumulation and dissipation circuit having the heat accumulator and configured to perform heat accumulation and dissipation while circulating the cooling water between the internal combustion engine and the heat accumulator;
the exhaust heat recovery device is arranged downstream of the internal combustion engine and upstream of the heat accumulator in the heat accumulation and dissipation circuit, wherein
the main circuit comprises a main pump disposed in the main circuit for circulating the cooling water,
the heat accumulation and dissipation circuit further comprises:
a heat accumulator pump disposed in the heat accumulation and dissipation circuit for sending the cooling water to the heat accumulator; and
a flow rate regulation valve for regulating the flow rate of the cooling water supplied to the heat accumulator;
the heat accumulation and dissipation device further comprises:
a control part for controlling the main pump, the heat accumulator pump and the flow rate regulation valve; and
a cooling water temperature detection part for detecting the temperature of the cooling water flowing into the internal combustion engine,
wherein the control part controls at least one of the main pump, the heat accumulator pump and the flow rate regulation valve so as to reduce the flow rate of the cooling water flowing out of the heat accumulator when the detected temperature of the cooling water is equal to or higher than a predetermined temperature.

2. The heat accumulation and dissipation device for internal combustion engine according to claim 1, wherein the main circuit has a common flow path that partially shares the flow path of the cooling water with the heat accumulation and dissipation circuit; and the exhaust heat recovery device is disposed in the common flow path.

* * * * *